United States Patent
Grodevant (10) Patent No.: US 7,961,214 B2
(45) Date of Patent: Jun. 14, 2011

(54) AUTOMATIC GAIN CONTROL FOR A CONFOCAL IMAGING SYSTEM

(75) Inventor: Scott R. Grodevant, Hilton, NY (US)

(73) Assignee: Lucid, Inc., Rochester, NY (US)

( * ) Notice: Subject to any disclaimer, the term of this patent is extended or adjusted under 35 U.S.C. 154(b) by 65 days.

(21) Appl. No.: 11/999,983

(22) Filed: Dec. 7, 2007

(65) Prior Publication Data
US 2008/0088721 A1    Apr. 17, 2008

Related U.S. Application Data (63) Continuation of application No. 09/966,043, filed on Sep. 28, 2001, now Pat. No. 7,321,394.

(60) Provisional application No. 60/237,105, filed on Sep. 29, 2000.

(51) Int. Cl.
*A61B 1/04* (2006.01)
*H04N 5/20* (2006.01)
(52) U.S. Cl. .......................... 348/69; 348/255
(58) Field of Classification Search .............. 348/68–69, 348/222.1, 229.1, 230.1, 255, 257–258, 370–371
See application file for complete search history.

(56) References Cited

U.S. PATENT DOCUMENTS

| | | | |
|---|---|---|---|
| 5,012,504 A * | 4/1991 | McFaul et al. ............... | 378/108 |
| 5,034,613 A | 7/1991 | Denk et al. | |
| 5,068,719 A * | 11/1991 | Tsuji .............................. | 348/65 |
| 5,546,189 A | 8/1996 | Svetkoff et al. | |
| 5,719,700 A | 2/1998 | Corcuff et al. | |
| 5,734,426 A | 3/1998 | Dong | |
| 5,788,639 A * | 8/1998 | Zavislan et al. .............. | 600/476 |
| 5,880,880 A | 3/1999 | Anderson et al. | |
| 5,995,867 A | 11/1999 | Zavislan et al. | |
| 6,151,073 A | 11/2000 | Steinberg et al. | |
| 6,151,127 A | 11/2000 | Kempe | |
| 6,399,942 B1 | 6/2002 | Ishihara | |
| 6,462,770 B1 | 10/2002 | Cline et al. | |
| 6,782,063 B1 | 8/2004 | Stevenson et al. | |

(Continued)

FOREIGN PATENT DOCUMENTS
JP    11-284904    10/1999

OTHER PUBLICATIONS

Rajadhyaksha et al., "In vivo Confocal Scanning Laser Microscopy of Human Skin: Melanin provides strong contrast," The Journal of Investigative Dermatology, vol. 104, No. 6, Jun. 1995, pp. 946-952.

(Continued)

*Primary Examiner* — Timothy J Henn
(74) *Attorney, Agent, or Firm* — Kenneth J. Lukacher (57) ABSTRACT

Automatic gain control is provided for a confocal imaging system to improve the quality of images produced by the system. The confocal imaging system utilizes an illumination source, such as a laser, to produce illumination which enables imaging of an object. The automatic gain control is provided by an automatic gain controller which operates in accordance with the counted number of pixels which are too bright, the counted number of pixels which are too dim, and the counted total number of pixels, or in accordance with the average value of pixels, of each two-dimensional frame of the images from the confocal imaging system to control the intensity of the illumination source. The automatic gain controller may be operative over either the entire frame, or a region thereof.

22 Claims, 6 Drawing Sheets

U.S. PATENT DOCUMENTS 6,859,230 B2    2/2005  Luo et al.
6,906,745 B1    6/2005  Fossum et al.
7,321,394 B1 *  1/2008  Grodevant ................... 348/370

OTHER PUBLICATIONS

Rajadhyaksha and Zavislan, "Confocal laser microscope images tissue in vivo," Laser Focus World, Feb. 1997, pp. 119-127.

Schmitt et al., "Optical characterization of dense tissue using low-coherence interferometry," Proc. of SPIE, vol. 1889 (1993), pp. 197-211.

Brochure, Looking Through the Window of Life, Lucid VivaScope, Lucid Technologies, Inc. (Mar. 1998).

Kesterson et al. "Confocal Microscope Capability with Desktop Affordability", Advanced Imaging, Oct. 1991, pp. 23-24.

* cited by examiner

AUTOMATIC GAIN CONTROL FOR A CONFOCAL IMAGING SYSTEM

This application is a continuation of U.S. patent application Ser. No. 09/966,043, filed Sep. 28, 2001, now U.S. Pat. No. 7,321,394 which claims the benefit of priority to U.S. Provisional Patent Application No. 60/237,105, filed Sep. 29, 2000 which is herein incorporated by reference.

FIELD OF THE INVENTION

The present invention related to automatic gain control for a confocal imaging system, and relates particularly to an automatic gain controller for controlling illumination intensity in a confocal imaging system. This invention is useful as a component of a confocal imaging system often referred to as a confocal microscope.

BACKGROUND OF THE INVENTION

Confocal microscopes optically section naturally or surgically exposed tissue to produce microscopic images of tissue sections. An example of a confocal microscope is the VivaScope® manufactured by Lucid, Inc. of Henrietta, N.Y. Other examples of confocal microscopes are described in U.S. Pat. Nos. 5,788,639, 5,880,880, and 5,995,867, and in articles by Milind Rajadhyaksha et al., "In vivo Confocal Scanning Laser Microscopy of Human Skin: Melanin provides strong contrast," The Journal of Investigative Dermatology, Volume 104, No. 6, June 1995, and Milind Rajadhyaksha and James M. Zavislan, "Confocal laser microscope images tissue in vivo," Laser Focus World, February 1997, pages 119-127.

Lucid's VivaScope®, and confocal imaging microscopes in general, use a raster scanned laser spot to illuminate the in-focus specimen plane. Refracted light from the in-focus plane is converted to an electrical signal, digitized using a conventional high-speed A/D (analog to digital) converter and displayed on a computer monitor as a two-dimensional image. The intensity of the image is both a function of imaging depth in a tissue specimen and the specimen's absorption characteristics. Typically, imaging depth is user controlled thereby requiring continuous laser power adjustment to maintain acceptable image brightness. Such manual control makes obtaining optimum imaging less efficient as numerous adjustment of laser power are often required as different sections of a tissue are imaged at different depths. Accordingly, it would be desirable to provide automatic control of laser power in a confocal microscope to maintain optimal image quality.

Although varying illuminating source intensity to maintain constant received signal strength is typically done in bar-code scanners, no mechanism has been provided for a confocal imaging system for controlling an illumination source, such as a laser, to improve the quality of two-dimensional confocal images.

SUMMARY OF THE INVENTION

Accordingly, it is the principal object of the present invention to provide automatic control of an illumination source of a confocal imaging system in accordance with measured parameters of images produced by the imaging system, such as brightness, to maintain optimal image quality.

Briefly described, the present invention embodies an automatic gain controller in a confocal imaging system which utilizes an illumination source, e.g., a laser, to provide the illumination enabling imaging of an object, such as tissue. The automatic gain controller receives a raster scan video of two-dimensional frames of images from the confocal imaging system and converts the raster scan video into pixels, where each pixel has a brightness value, such as 0 to 255 (0-black, 255-white). A first counter counts the number of pixels in each frame of the image which have a brightness value above an upper threshold, such as 250, and a second counter counts the number of pixels in each frame of the image which are below a lower threshold, such as 10. A third counter counts the total number of pixels in each frame of the image. A first comparator compares the value of the first counter with a value representing a first percentage, such as 12.5%, of the total pixels of the frame from the third counter, while a second comparator compares the value of the second counter with a value representing a second percentage, such as 50%, of the total pixels of the frame from the third counter. Dividers may be provided to obtain the first and second percentages of the total pixels from the third counter for input to the first and second comparators. An output circuit produces first and second digital control signals based on the output of the first and second comparators after each frame is received, in which the first control signal is active when the value from the first counter exceeds the value representing the first percentage of the total pixels of the frame, and the value from the second counter exceeds the value representing the second percentage of the total pixels of the frame, and the second control signal is active when the value of the second counter is below the value representing the second percentage of the total pixels of the frame, and the value of the first counter is below the value representing the first percentage of the total pixels of the frame. The first and second control signals are received by a controlling computer of the confocal imaging system. The computer is enabled to send electrical signals to the illumination source to increase the power to the illumination source when the first control signal is active, and to reduce the power to the illumination source when the second control signal is active, and thereby adjust the intensity of the illumination in the confocal imaging system. If neither of the control signals are active, then illumination in the confocal imaging system is in its optimal range.

Optionally, circuitry may be provided in the automatic gain controller to convert the digital control signals into an analog control signal capable of locally controlling the power to the illumination source, rather than via control signals to the controlling computer of the confocal imaging system. The automatic gain controller operates in accordance with timing signals of the confocal imaging system, such as frame clock signal defining the period where each frame of the images are received, and a pixel clock signal defining the period where each pixel of the images is received.

The logical processes provided by the first and second comparators, the dividers, and the output circuit of the automatic gain controller may alternatively be provided by the controlling computer of the confocal imaging system in which the controlling computer receives as input the values of the first, second and third counters, and based on such values determines whether the power to the illumination source should be increases, decreased, or maintained.

In another embodiment, the automatic gain controller operates in accordance with timing signals received from a rectangular region detector in the automatic gain controller, such that the automatic gain controller is operative only over a predefined rectangular region in each of the images, rather than the full frame of the images. This region detector receives the timing signals from the confocal imaging system, such as the frame clock signal, pixel clock signal, and an additional signal, line clock, defining the period each line of the image is received, and outputs timing signals to the automatic gain controller when the region of interest is being received from the raster scan video from the confocal imaging system, and no timing signals when the region is not being received, such that only pixels of the region are counted by the first, second, and third counters in each frame. The rectangular region of interest in image frames may be set by the controlling computer of the confocal imaging system.

In a further embodiment, the first and second counters are replaced with a summing circuit in the automatic gain controller to provide the sum of the pixel intensities per frame (or a rectangular region in each frame). Both the sum value and the count of the number of pixels per frame (or rectangular region in each frame) from the third counter are provided to the controlling computer of the confocal imaging system. The controlling computer divides the sum by this count to provide the average pixel intensity per frame (or a rectangular region in each frame) and uses this result to enable proportional control of illumination source power.

The present invention further includes a method of automatic gain control carried out by the automatic controller of the above described embodiments, and a confocal imaging system having an automatic gain controller of the above described embodiments.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF INVENTION

Figure 1:
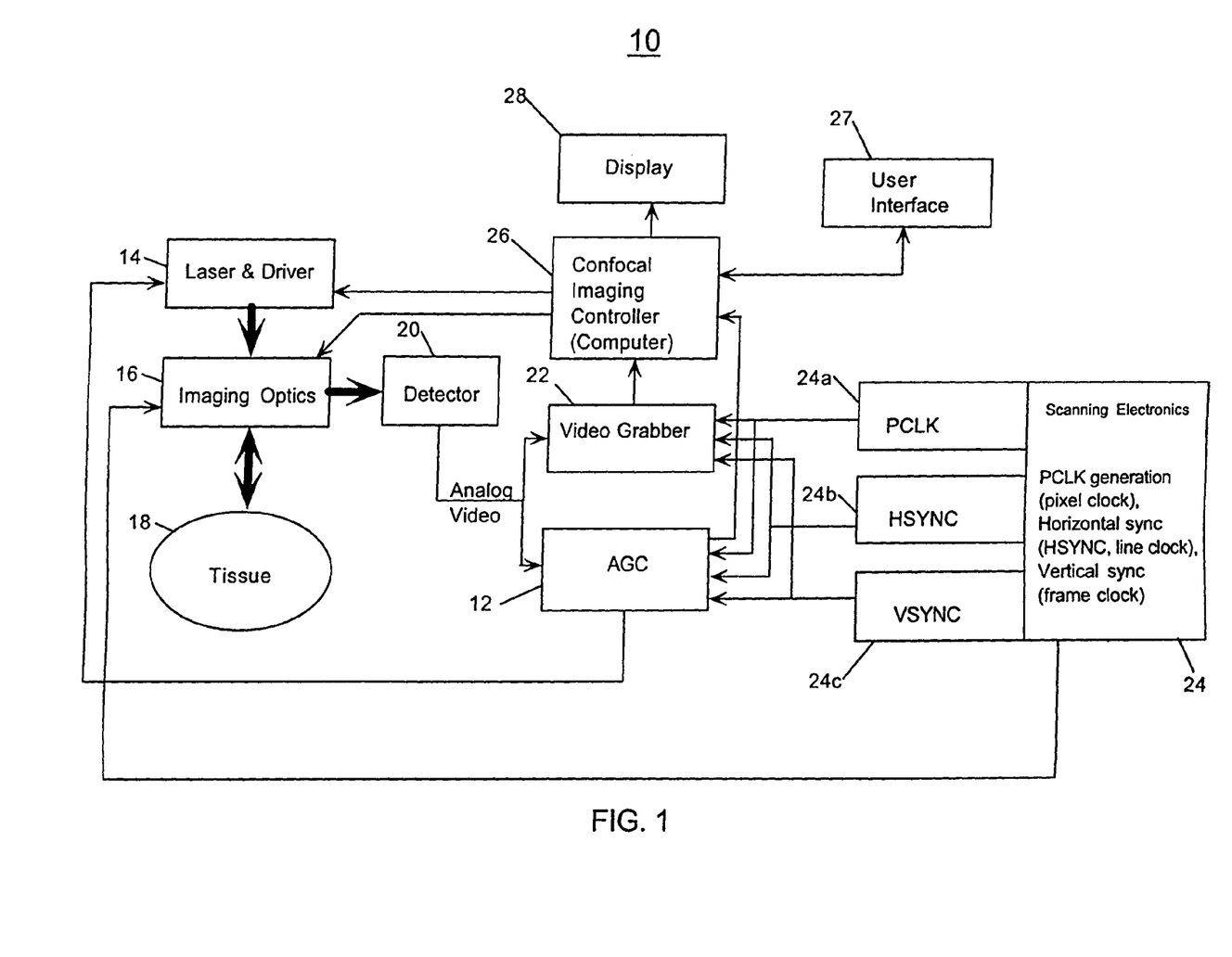
FIG. 1 is a block diagram of a confocal imaging system with the automatic gain controller of the present invention.

Referring to FIG. 1, a block diagram of a confocal microscope 10 with the automatic gain controller (AGC) 12 is shown. An illumination source, referred to herein for example as laser 14, provides illumination, such as a laser beam, to confocal imaging optics 16 which scan and focus the illumination in a spot through an object or tissue 18 (i.e., on or under the tissue surface). Light returned from the tissue 18 is collected by imaging optics 16 onto a confocal detector 20 which outputs an electrical signal representing a section of the tissue to a video grabber 22. The signal from detector 20 represents an analog raster scan of a two-dimensional image (ANALOG VIDEO). Confocal detector 20 spatially limits the returned light to a particular in-focus plane, such as with a photodetector via a pinhole aperture, or other spatial limiting means. The raster scan operates in synch with the scan of the illumination in the tissue, such that an image of a section is provided. Clocks 24, such as pixel, line, and frame clocks 24a, 24b, and 24c, provide synchronization of the raster scan by providing PCLK, HSYNC, and VSYNC signals, respectively. The ANALOG VIDEO signal is outputted to AGC 12 and, via a video grabber 22, to a confocal imaging controller 26 of a confocal imaging system. The confocal imaging controller 26 may be a personal computer programmed in accordance with the present invention to control imaging parameters which include the adjustment of the power to laser 14, thereby adjusting the intensity of the illumination from the laser, and in turn the brightness of images enabled by such illumination. The video grabber 22 may be a printed circuit board in such personal computer. The confocal imaging controller 26 outputs confocal images of tissue sections to a display 28 from the video grabber 22 in accordance with the ANALOG VIDEO signal. Other output devices may be included in addition to display 28, such as a printer, memory storage unit, WAN or LAN network, or Internet connection to a web site. A user interface 27, such as a keyboard and/or mouse, as typical of a computer, may also be coupled to controller 26. The confocal imaging controller 26 is coupled to laser 14 to enable and control the power to the laser, and coupled to the imaging optics 16 to control the scanning mechanism of the imaging optics. The confocal imaging controller 26 can operate responsive to digital control signals received from AGC 12 to change the power to the laser 14, as described below, such that the brightness of the confocal images provided on display 28 may be optimized. The laser 14 includes a driver for operating the laser in response to signals from controller 26, such signals may provide a digital value representing the current for the laser 14 which the driver converts (D/A) to an analog current applied to the laser 14.

Components 14, 16, 20, 22, 24, 26, 27 and 28 represent typical parts of a confocal microscope, such as the VivaScope® manufactured by Lucid, Inc. of Henrietta, N.Y., or the confocal microscope or imaging systems described in U.S. Pat. Nos. 5,788,639, 5,880,880, or 5,995,867, or in allowed U.S. patent application Ser. No. 09/086,117, filed May 28, 1998, now U.S. Pat. No. 6,151,127, which are herein incorporated by reference. Any confocal microscope, or other type of optical imaging microscope capable of providing microscope sections in video images, such as optical coherence tomography or interferometry, or two-photon laser microscope imaging, may utilize the below described AGC 12. An example of optical coherence tomography or interferometry is described in Schmitt et al., "Optical characterization of disease tissues using low-coherence interferometry," Proc. of SPIE, Volume 1889 (1993), and an example of a two-photon laser microscope is described in U.S. Pat. No. 5,034,613.

Figure 2:
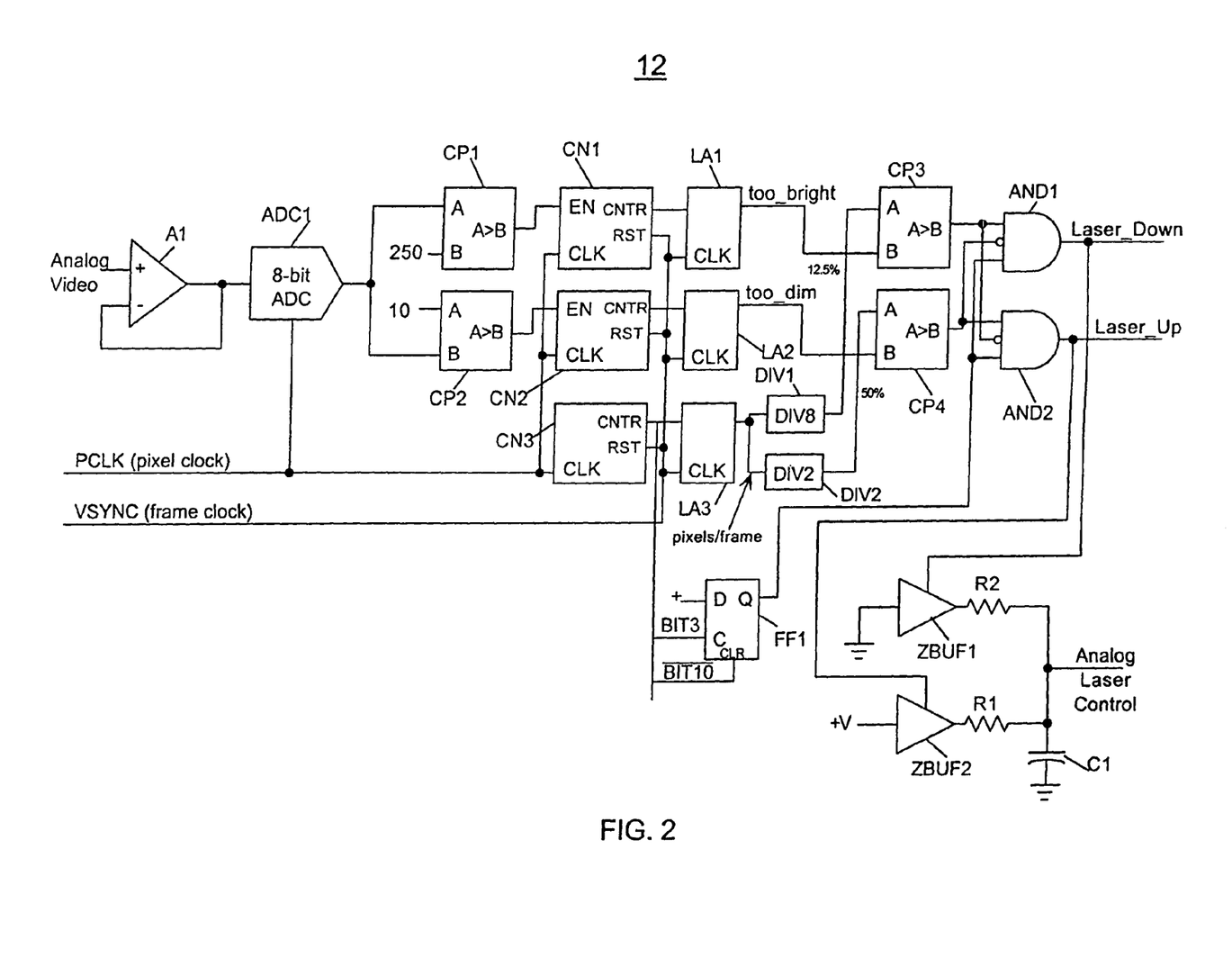
FIG. 2 is a schematic diagram of the automatic gain controller of FIG. 1 to provide control signals to the controller of the confocal imaging system to adjust the power to the illumination source, and an alternative circuit to enable the automatic gain controller to provide an analog control signal to the illumination source.

Referring to FIG. 2, the circuitry of the AGC 12 is shown for measuring the brightness of confocal images in terms of predefined parameters. The electronic components of FIG. 2 are primarily digital in nature with exception of the analog video input buffer A1 and an optional analog laser intensity control output circuit 29. The microscope 10 produces a ground reference, DC coupled analog luminescence signal (pixel or pixel signals) referred to as ANALOG VIDEO. The AGC 12 analyses this signal to accordingly adjust image brightness by laser power adjustment. Such image brightness control in AGC 12 is based on two underlying assumptions: 1) if more than 12.5% (⅛'th) of the image's total pixels are near saturation the image is too bright; 2) if more than half of the image's pixels are near absolute black the image is too dark.

The ANALOG VIDEO signal is buffered by amplifier A1 and fed into analog-to-digital (A/D) converter ADC1. The buffer amplifier is included to prevent this circuit from adding noise to the ANALOG VIDEO signal that is also supplying the video grabber 22. A/D conversion is synchronized to the pixel clock signal (PCLK). Each digitized pixel is compared with two values, 10 and 250, representing DIM and BRIGHT threshold values, respectively. The comparisons are performed by digital comparators CP2 and CP1, respectively. The DIM and BRIGHT values might be known ahead of time, as is the case for this example, or they be loaded by the controller 26 during operation, where the controller 26 is connected to programming lines to CP1 and CP2 to set these values. Programmable logic, as is commonly available from companies such as the Xilinx, Inc. and Altera, Inc. may be used to implement AGC 12.

Counters CN1, CN2 and CN3 count the number of bright, dim and total pixels in a frame, respectively. Once each frame, as defined by the frame clock signal (VSYNC) which defines the period in which each frame is received, the number of bright pixels outputted from CN1 is compared by comparator CP3 to ⅛'th of the total number of pixels (12.5%), the output of divider circuit DIV1, and the number of dim pixels outputted from CN2 is compared by comparator CP4 to ½ the total pixels (50%), the output of DIV2. In other words, comparator CP3 compares input signal TOO_BRIGHT from CN1 received, via latch LA1, and the output of DIV1 representing 12.5% of the output of CN3, via latch LA3, and comparator CP3 compares TOO_DIM from CN2, via latch LA2, and the output of DIV3 representing 50% of the output of CN3, via latch LA3. Latches LA1, LA2, and LA3 operate for each frame in accordance with the VSYNC frame clock signal, as shown in FIG. 2.

Preferably, division in AGC 12 provided by DIV1 and DIV2 is required only by integer powers of 2, so that division can be achieved by comparing shifted bit values. For example, for division by 8 (such as provided by DIV1) of a 16-bit number of input BITS 0-15 into output BITS 0-15, input BIT 3 is coupled to output BIT 0, input BIT 4 is coupled to output BIT 1, input BIT 5 is coupled to output BIT 2, and so forth, where input BITS 0-2 are unused and output BITS 13-15 are zeros.

The outputs of CP3 and CP4 are received as inputs to AND1 and AND2 as shown in FIG. 2 to provide the following. If 12.5% of the frame's pixels are bright and more than 50% are not dim, the LASER_DOWN signal is asserted by AND1. Conversely, if more than 50% of pixels are dim and less than 12.5% are bright, LASER_UP is asserted by AND2. If neither or both of these two conditions is satisfied neither LASER_UP nor LASER_DOWN is asserted. When one of the LASER_DOWN signal or LASER_UP signal is asserted by AND1 or AND2, respectively, the respective asserted signal is active (high), and the non-asserted signal is not active (low).

The AND1, AND2, and flip-flop FF1 components represent an output circuit in AGC 12 providing these digital control signals LASER_DOWN and LASER_UP. Flip-flop FF1 output is connected to one of three inputs of each AND1 and AND2 component, and generates a time-window indicating when the latched counter outputs are valid for comparison, between pixels 8 and 1024 of a frame. BIT 3 and BIT 10 lines are provided from the output of CN3 to FF1 to achieve this, in which the signal from the BIT 3 output of CN3 rises (i.e., switches from 0 to 1) on the count of 8, and the signal on BIT 10 output of CN3 rises on the count of 1024. The first value of 8 is large enough to insure latches LA1-3 are stable, the second value of 1024 is large enough so the overall gate width of FF1 is sufficient for external circuitry. In addition to the FF1 output, AND1 receives as input the output of CP3 and the inverse (NOT) of the output of CP4, and AND2 receives as input the output of CP4 and the inverse (NOT) of the output of CP3 to achieve the desired logic. If needed, additional logic components (inverters) may be provided to NOT the output of the CP3 and CP4 before input to AND2 and AND1, respectively.

These two output control signals, LASER_UP and LASER_DOWN, are monitored by the controller 26 to adjust laser 14 power by fixed, but not necessarily equal amounts, in the indicated direction. The controller 26 in response to the control signals is programmed to increase the digital current value sent to the driver of laser 14 by an up index value, if LASER_UP is asserted and LASER_DOWN is not asserted, or decrease the digital current value sent to the driver of laser 14 by a down index value, if LASER_DOWN is asserted and LASER_UP is not asserted. The up and down index values may both be, for example, equal to one. However, other up and down index values may be used depending on the imaging system, and the desired response time to change image brightness more is one direction than the other. Further, the up and down index values may be preset variables adjustable by the manufacturer of the imaging system 10, or may be modifiable by the operator of the system 10 via its user interface 27. By adjusting the amplitude of the current applied to laser 14, the laser's operating power, which is proportional to such current, is thereby controlled.

Alternately, laser control is performed locally using the optional analog laser control output signal named ANALOG LASER CONTROL from additional output circuit 29 in AGC 12 of FIG. 2. ANALOG LASER CONTROL is shown in FIG. 1 as a dotted line. This signal provides an analog output voltage whose amplitude is proportional to desired laser operating current, in which the driver of laser 14 operates responsive to the ANALOG LASER CONTROL signal rather than a digital current value to provide the current applied to the laser. Its operation is similar to many common phase comparator pump circuits used in PLLs (phase lock loops). The LASER_DOWN signal activates the enable signal of a three-state buffer ZBUF1. ZBUF1 discharges capacitor C1 through resistor R2. Conversely, the LASER_UP signal enables three-state buffer ZBUF2 allowing C1 to charge to the supply voltage through R1. The time-constants formed by C1-R1, and C1-R2 determines the system response, and hence the control loop response characteristics. The output from circuit 29 should be buffered to prevent leakage current from significantly affecting C1's charge.

Figure 3:
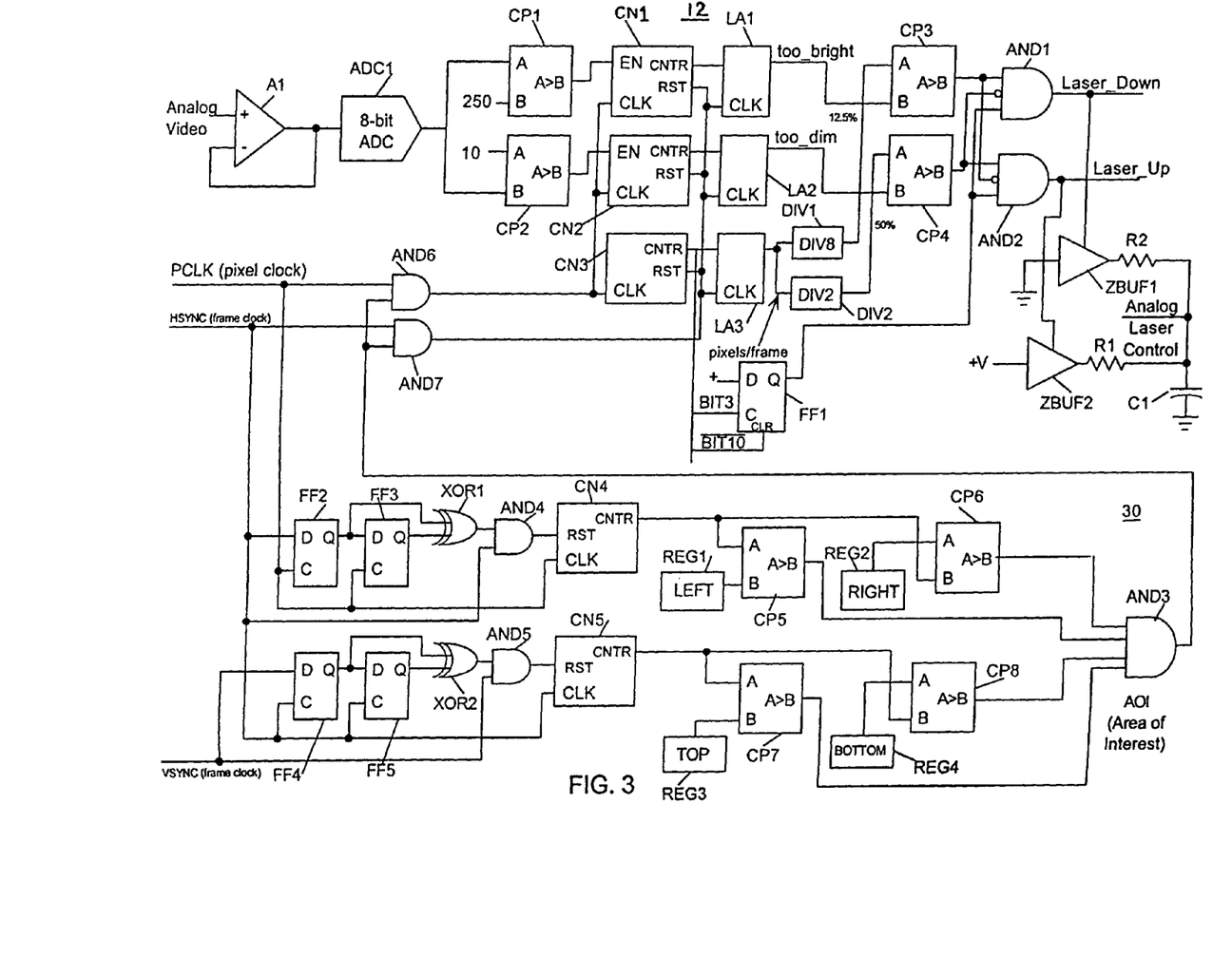
FIG. 3 is a schematic diagram of another embodiment of the automatic gain controller of FIG. 1 in which the controller is operative over a rectangular region in each image frame produced by the confocal imaging system.

Referring to FIG. 3, another embodiment of present invention is shown which is the same as the AGC 12 of FIG. 2 with the additional circuitry providing rectangular region detector 30. Rectangular region detector 30 modifies clock signals received by the AGC 12 of FIG. 2 so that such clock signals are received only when a particular region of interest in each frame of the ANALOG VIDEO signal is received by the AGC. An additional line clock signal (HSYNC) is provided to the AGC in this embodiment from the confocal imaging timing signals from scanning electronics 24 (FIG. 1). Although shown in FIG. 1, the line clock signal is not needed in the embodiment of the AGC 12 of FIG. 2.

Counters CN4 and CN5 track the current pixel and line positions, respectively, on the display 28 based on the PCLK, HSYNC, and VSYNC signals. The digital edge detector circuit formed by flip-flop FF2, flip-flop FF3, XOR1 and AND4 having the connections illustrated in FIG. 3 produce a single pulse on the rising edge of the HSYNC signal (e.g., the start of each scan line), thus resetting counter CN4. In this manner, CN4's count is always the pixel number in each scan line. Likewise, flip-flop FF4, flip-flop FF5, XOR2, and AND5 force CN5 to count the number of scan lines elapsed in the current frame. Digital comparators CP5, CP6, CP7, and CP8 compare the current pixel location (pixel and scan line) with registers REG1, REG2, REG3, and REG4, respectively. These registers are loaded from the controller 26 with LEFT, RIGHT, TOP and BOTTOM values that define a screen rectangle of the area (region) of interest (AOI). When all comparator outputs are simultaneously high, the beam is in the AOI as signaled by AND3's output activating. This signal AOI effectively enables the AGC circuit of FIG. 2 through AND6 and AND7 and the operation of the AGC 12 of FIG. 2 over the predefined region.

With the additional circuitry of the rectangular region detector 30, means are provided capable of selecting less than the entire frame of each image in a window of the display area of the images which can ignore display fringe areas of an image that may be affected by optical distortion and not necessarily represent an accurate representation of the image.

Although the DIM and BRIGHT threshold values, and percentages of bright or dim pixels described above are preferred, other values and/or percentages may be used to obtain optimal image quality in accordance with the particular imaging system. Controller 26 of the system 10 may have the ability to retrieve and transmit key values to components of the AGC 12 circuitry, such as lines coupled between input or output of logic components to ports on an I/O card of the controller 26. For example, this enables the controller 26 to update the 10 and 250 threshold values used by CP1 and CP2, or retrieving the output values of LA1, LA2, and LA3.

Figure 4:
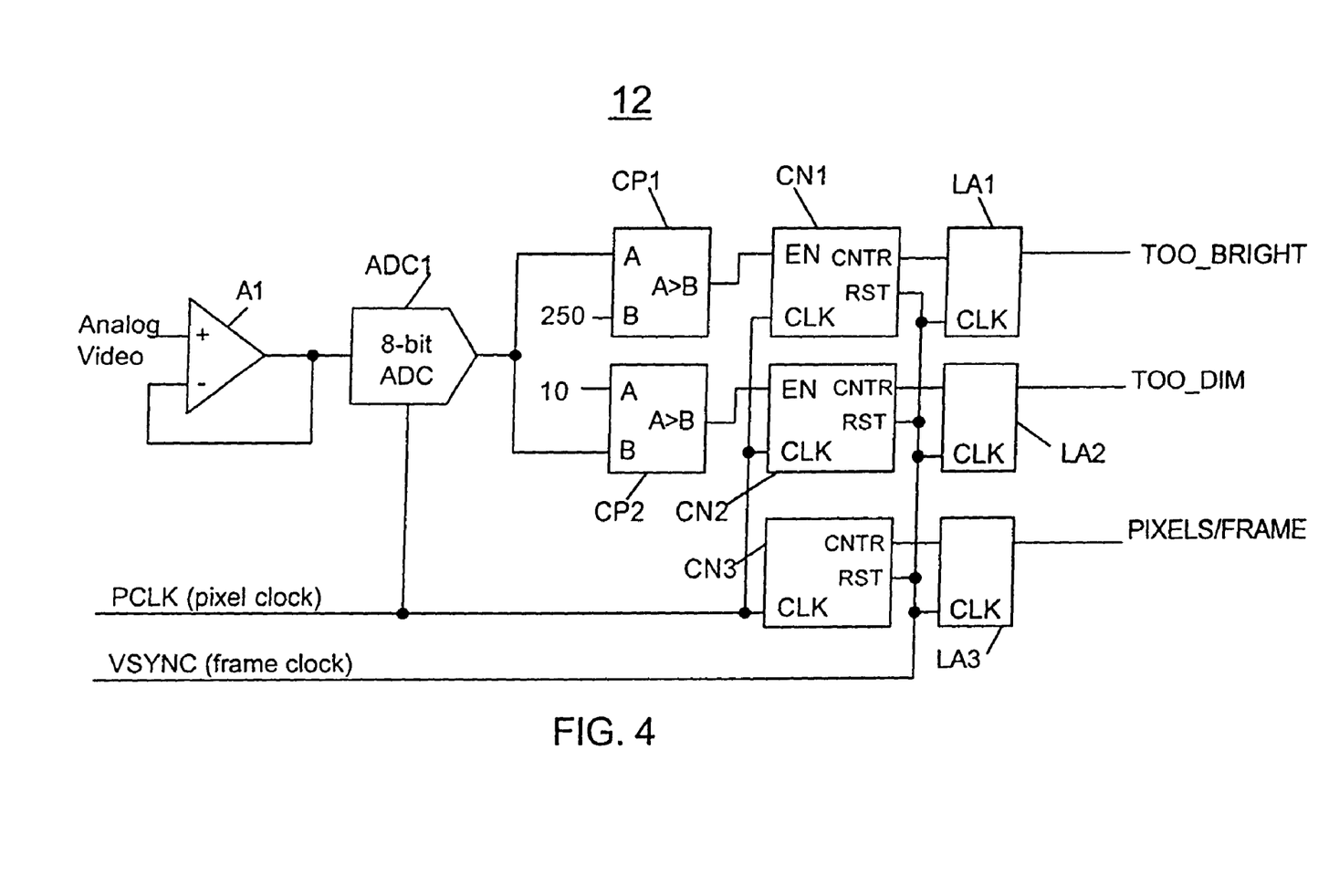
FIG. 4 is a schematic diagram of the automatic gain controller similar to FIG. 2 in which the controller of the confocal imaging system provides the logical calculation of the power adjustment of the illumination source rather than by logic components.

In a less preferred embodiment, controller 26 may receive the output values (signals) of CN1, CN2, and CN3, via LA1, LA2, and LA3, respectively, as shown in the AGC of FIG. 4. FIG. 4 is similar to FIG. 2 absent the output circuit provided by FF1 and components AND1 and AND2. Controller 26 receives the number of pixels which are too bright (TOO_BRIGHT), the number of pixels which are too dim (TOO_DIM), and the number of pixels of the frame as each frame of an image is being received (PIXELS/FRAME), from LA1, LA2, and LA3, respectively, and provides the same logical operations as provided for by DIV1, DIV2, CP3, CP4, AND1 and AND2 of FIG. 2 to obtain control signals similar to LASER_UP and LASER_DOWN to adjust the power of illumination source 14. The controller 26 may retrieve these values at a time after each frame is complete by monitoring VSYNC or other timing signals. Further, rectangular region detector circuit 30 with AND6 and AND7 (FIG. 3) may be incorporated in the AGC of FIG. 4 to replace the signals provided by PCLK and VSYNC signals, and thereby enable AGC operation over a rectangular region.

Figure 5:
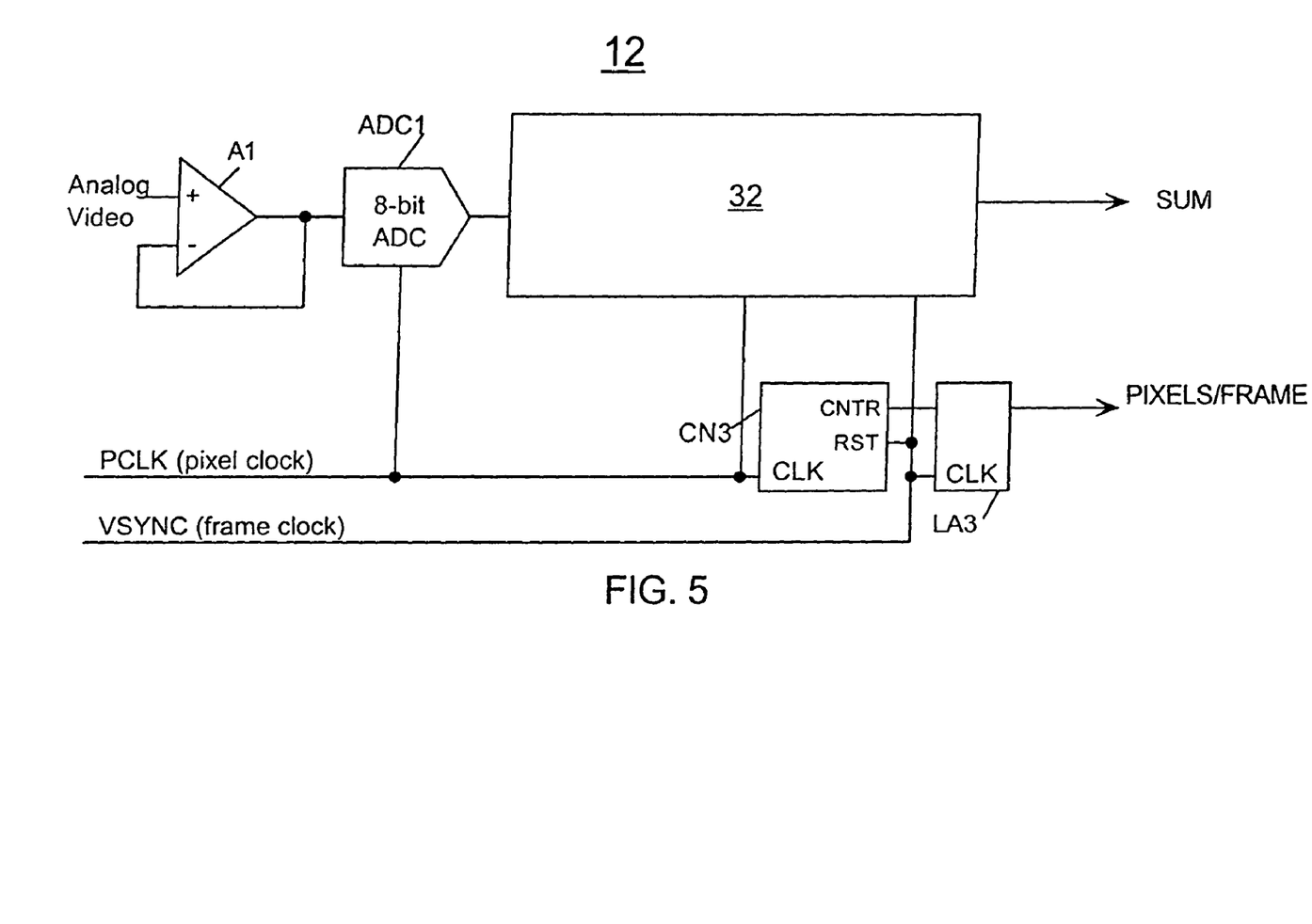
FIG. 5 is a schematic diagram of a further embodiment of the automatic gain controller of FIG. 1 which enables proportional control.
Figure 5A:
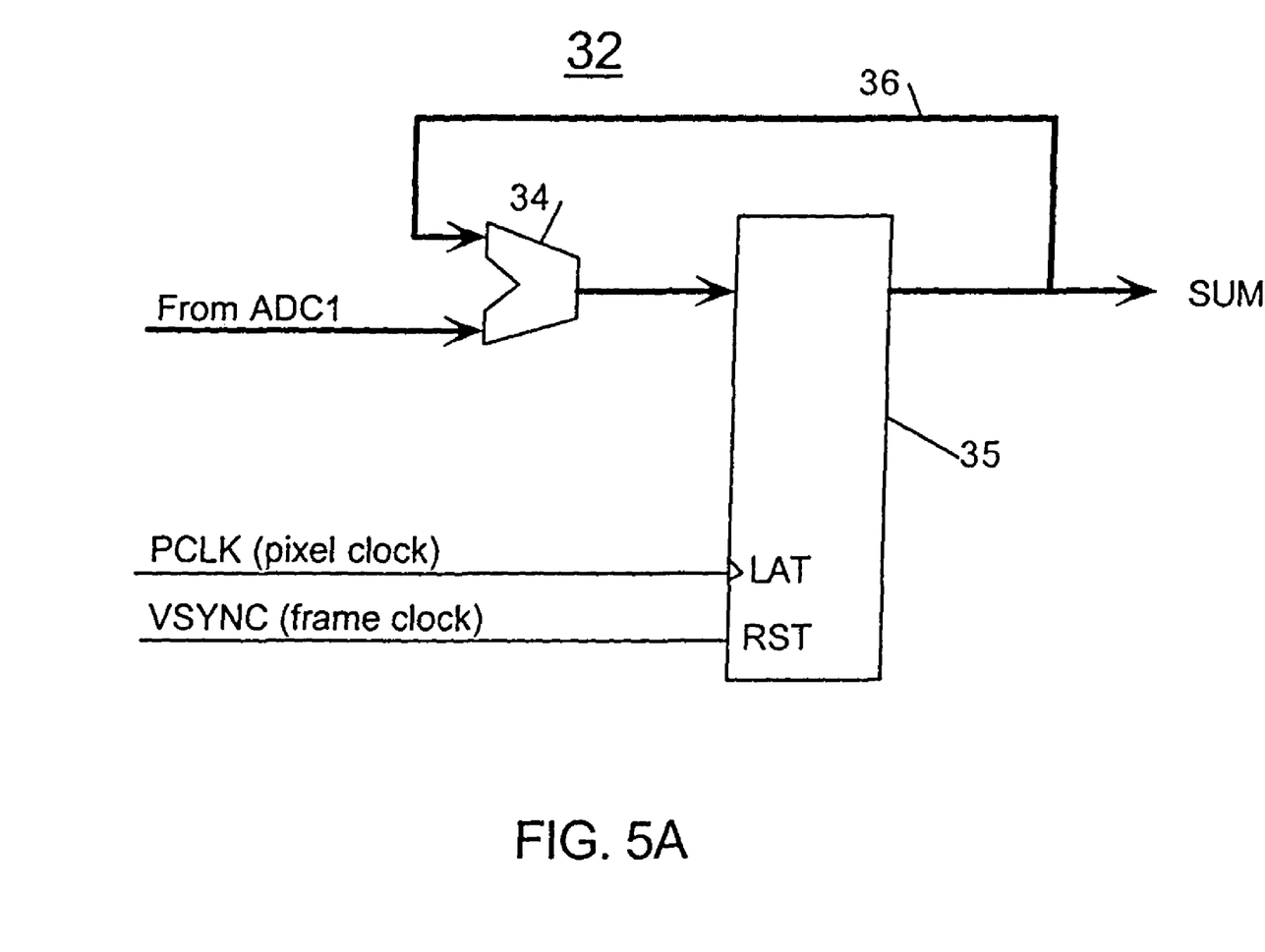
FIG. 5A is a circuit in the embodiment of the automatic gain controller of FIG. 5 to provide summing of pixel intensities in each image frame.

Alternatively, AGC 12 may apply a simple averaging function over all pixels in the image to yield a single numeric value, as shown in the AGC of FIG. 5. This may be achieved by replacing counters CN1 and CN2 of FIGS. 2 and 3, and their subsequent components, with the circuit 32 to sum the pixel intensity (brightness) values over each frame of each image. Each pixel has a brightness value, such as in the range from 0 to 255 (0—black, 255—white). As shown in FIG. 5A, circuit 32 includes an adder 34 which adds each pixels brightness value from ADC1 with the sum of the previous pixel brightness values for a frame from the value on input 36. A latch 35 is clocked in accordance with the PCLK signal to receive the output of adder 34 and maintains that value as output SUM to the controller 26. The output SUM is coupled to input 36 of adder 34 to provide the SUM of the previous pixel brightness values to the adder. Latch 35 resets its output SUM to zero for each frame in accordance with VSYNC. In FIG. 5, the output SUM from circuit 30, and the output of LA3 representing the number of pixels of each frame, is provided to controller 26. When the frame is complete, as clocked by VSYNC or other timing signals which controller 26 monitors, the controller 26 divides the received SUM by the count of the pixels from LA3 to provide a ratio representing the average pixel intensity of the frame. The result may be compared to a desired intensity value in the controller 26 to accordingly increase or decrease laser 14 power, and thus provide a digital control (proportional) loop. For example, a desired intensity, such as 128, may be subtracted from the calculated average pixel intensity, and the result then multiplied by a constant which can provide an analog signal to the illumination (laser) source 14 which increases or decreases the power to the source toward the desired intensity. Proportion control is enabled in FIG. 5 by removal of FF1, which would otherwise fix the correction interval as in FIGS. 2 and 3 by the duration of FF1's high-time. Further, to operate the circuit of FIG. 5 over a rectangular region of interest, rather than the entire frame, circuit 30 (FIG. 3) may be added with AND6 and AND7 (FIG. 3) to replace the signals provided by PCLK and VSYNC signals in FIG. 5.

From the foregoing description, it will be apparent that automatic gain control for a confocal imaging system has been provided. Variations and modifications in the herein described automatic gain controller, methods for automatic gain control, and confocal imaging system incorporating such automatic gain controller, in accordance with the invention will undoubtedly suggest themselves to those skilled in the art. For example, other logic components may be used to provide the logic circuitry shown in the figures. Accordingly, the foregoing description should be taken as illustrative and not in a limiting sense.

The invention claimed is:

1. A system for imaging an object having at least one surface comprising:
   a source for illumination;
   optics for scanning the illumination to the object and receiving returned illumination representing at least one section of the object;
   means for detecting the returned illumination and forming an analog signal representative of at least one image of the section of the object in which said section is capable of being below the surface of said object;
   means for converting said analog signal into digital pixels in which each pixel has a value;
   means for displaying said image of the section of the object in accordance with said signal; and
   means for automatically controlling the intensity of said illumination source in accordance with the average value of all pixels in a region of the image regardless of their value when converted by said converting means, in which said region excludes the pixels of the image which are subject to optical distortion.

2. The system according to claim 1 wherein said optics represent confocal optics and said detecting means represent confocal detecting means.

3. The system according to claim 1 wherein said system is adapted for imaging by one of confocal microscopy, optical coherence tomography, and two-photon microscopy.

4. The system according to claim 1 wherein said object represents tissue.

5. The system according to claim 1 wherein each of the pixels has said value in a range of brightness values from zero representing the darkest value to a maximum or brightest value, and said controlling means comprises:
- means for summing the value of the pixels of the region to provide a summed value, in which pixels of any value in said range in said said region are summed;
- means for counting the number of pixels in the region;
- means for determining said average pixel value in accordance with said summed value and said counted number of pixels; and
- means for adjusting the power to the illumination source in accordance with said average pixel value.

6. The system according to claim 5 wherein said controlling means further comprises means for limiting said pixels summed and counted to ones of said pixels in the region of the image, wherein said average pixel intensity is representative over said region.

7. The system according to claim 1 wherein said means for automatically controlling said illumination source is enabled for each successive ones of the image to effect the brightness of said successive ones of the image on the display.

8. The system according to claim 1 wherein said means for detecting and forming further comprises means for detecting and spatially limiting the returned illumination to form a signal representative of an image of a section of the object.

9. The system according to claim 1 wherein said image when displayed has brightness variable in accordance with at least imaging depth of the section when below the surface of the object.

10. The system according to claim 1 wherein said means for converting converts said analog signal into digital pixels in which each pixel has a value in a range of brightness values from zero representing the darkest value to a maximum or brightest value, and said means for controlling controls the intensity of said illumination source operates in accordance with all pixels of any value in said range in the image or the region of the image thereof.

11. An automatic gain controller for an imaging system capable of producing successive frames of images, wherein said imaging system has an illumination source, said automatic gain controller comprising:
- means for receiving an analog signal representing frames of images and converting the analog signal into digital pixels in which each pixel has a brightness value in a range from zero representing the darkest value to a maximum or brightest value;
- means for summing for each frame the brightness value of the pixels to provide a summed value, in which pixels of any value in said range are summed for the frame;
- means for counting for each frame the number of pixels in the frame;
- means for determining for each frame an average pixel intensity in accordance with said summed value and said counted number of pixels;
- means for controlling an illumination source of the confocal imaging system in accordance with said average pixel intensity; and
- means for limiting said pixels summed by said summing means and counted by said counting means to ones of said pixels in a region of each of said frames to exclude from said summing means and said counting means the pixels outside said region which are subject to optical distortion.

12. A method for imaging an object having at least one surface comprising the steps of:
- providing a source for illumination;
- scanning and focusing the illumination to the object;
- receiving returned illumination representing at least one section of the object in which said section is capable of being below the surface of said object;
- detecting the returned illumination and forming an analog signal representative of an image of the section of the object;
- converting said analog signal into digital pixels in which each pixel has a value;
- displaying said image of the section of the object in accordance with said signal; and
- automatically controlling the intensity of said illumination source in accordance with the average value of all pixels in a region of the image regardless of their value when converted, in which said region excludes the pixels of the image which are subject to optical distortion.

13. A method for automatic image quality control for an imaging system capable of producing successive frames of images in which said imaging system has an illumination source, said method comprising the steps of:
- converting an analog signal representing frames of images into digital pixels in which each pixel has a brightness value in a range from zero representing the darkest value to a maximum or brightest value;
- summing for each frame the brightness value of the pixels of to provide a summed value, in which pixels of any value in said range are summed for the frame;
- counting for each frame the number of pixels in the frame;
- determining for each frame an average pixel intensity in accordance with said summed value and said counted number of pixels for the frame; and
- controlling an illumination source of the confocal imaging system in accordance with said average pixel intensity; and
- limiting said pixels summed and counted to ones of said pixels in a region of each of said frames to exclude the pixels of the image which are subject in the frame to optical distortion, and said average pixel intensity determined by said determining step is the average pixel intensity in said region.

14. A system for automatic image quality control for an imaging system in which each one of successive frames of images is represented by pixels each having a value and said imaging system has an illumination source, said system comprising:
- circuitry to sum for each of said frames the value of pixels of a region of the frame, said region exclude pixels outside the region which are subject to optical distortion;
- a counter to count for each of said frames the number of pixels summed; and
- a controller to control power to the illumination source in accordance with a ratio of the value summed and the number of pixels counted.

15. The system according to claim 14 further comprising a converter which convert each the successive video frames from an analog signal representative of the frame into pixels for use by said summing circuitry and said counter.

16. The system according to claim 14 further comprising circuitry to limit the number of pixels summed by the summing circuitry and counted by said counter to said region of each of said frames.

17. The system according to claim 14 wherein each pixel has a brightness value in a range from zero representing the darkest value to a maximum or brightest value.

18. A system for imaging an object having at least one surface comprising:
- a source for illumination;

optics for scanning the illumination to the object and receiving returned illumination representing at least one section of the object;

a detector for detecting the returned illumination and forming an analog signal representative of at least one image of the section of the object in which said section is capable of being below the surface of said object and said image is subject to distortion by said optics along fringe areas of said image;

an automatic gain controller which receives said signal representative of said image, converts said analog signal into digital pixels in which each pixel has a value representative of brightness, and provides one or more control signals in accordance with at least the average value of all pixels associated with a region of the image selected to exclude said fringe areas of the image which are subject to distortion by said optics; and a computer system and a display in which said computer system enables said display to output said image of the section of the object in accordance with said signal representative of said image, and one of said computer system which receives said one or more control signals, or said one or more control signals from said automatic gain controller, effects control of intensity of said source to improve brightness of the image on said display, wherein the brightness of said image is variable in accordance with at least imaging depth of said section when below the surface of said object.

19. The system according to claim 18 wherein said detector spatially limits the returned illumination in forming said signal representative of said at least one image of a section of the object.

20. The system according to claim 18 wherein said automatic gain controller converts said analog signal into said digital pixels in which each pixel has a value in a range of brightness values from zero representing the darkest value to a maximum or brightest value, and provides one or more control signals in accordance with the average value of all pixels of any value in said range associated with the region of the image.

21. The system according to claim 18 wherein said one or more control signals are in accordance with at least the average value of all pixels associated with the region of the image regardless of their value when converted.

22. The system according to claim 18 wherein said region is rectangular.

\* \* \* \* \*